O. FREY.
PERCH.
APPLICATION FILED MAY 26, 1916.
1,331,908. Patented Feb. 24, 1920.
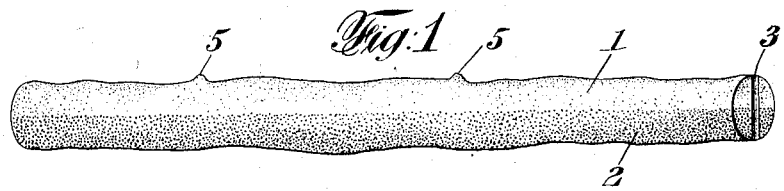
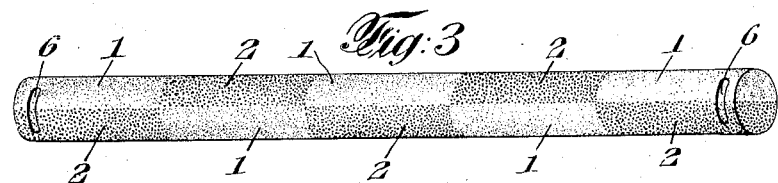
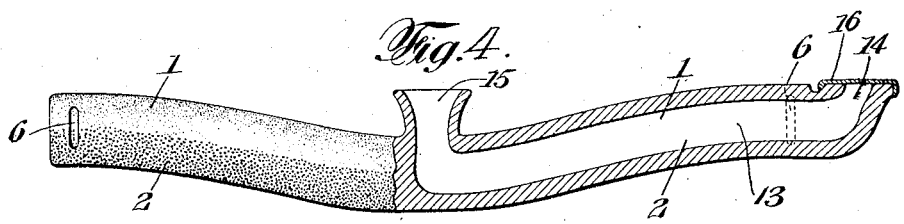
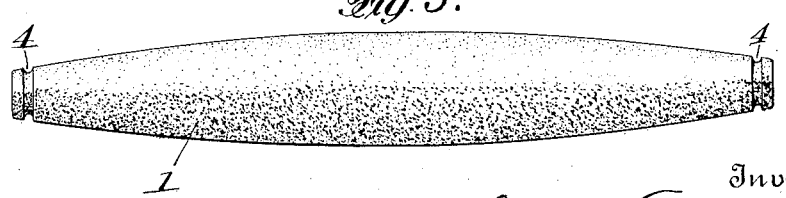
Inventor
Oscar Frey
By his Attorneys
Kenyon & Kenyon

UNITED STATES PATENT OFFICE.

OSCAR FREY, OF NEW YORK, N. Y.

PERCH.

1,331,908.  Specification of Letters Patent.  Patented Feb. 24, 1920.

Application filed May 26, 1916. Serial No. 99,990.

*To all whom it may concern:*

Be it known that I, OSCAR FREY, a citizen of the United States, and a resident of New York, county of Bronx, in the State of New York, have invented certain new and useful Improvements in Perches, of which the following is a specification.

My improvement relates to perches which are provided in cages for the use of birds or other animals in captivity. While perches are usually intended as resting places, they are also designed to afford the birds or other animals such exercise as they get in jumping from perch to perch, the ordinary cage in the case of birds, being too small for extended flight. This of course does not apply to large cages, such for example as are used for exhibition purposes, or by bird fanciers or in aviaries. Cages of this kind are usually large enough to give the captives opportunity to exercise by flying. My invention, however, is applicable to cages of all sizes and in all of them serves the same purposes.

The main object of my invention is to provide a perch for birds which, in addition to performing these usual functions, is constructed to keep the bills of the birds sharp and their nails or claws in such condition as to make the trimming of them practically unnecessary. One of the duties of men having charge of birds in captivity is to trim their claws or nails at regular intervals, and this can not be overlooked if the birds are to be kept in healthy condition. My invention makes it possible to dispense with this work almost entirely, which not only lessens the labor of the men so engaged, but obviates the danger of the birds becoming injured while being handled.

My invention also does away with the use of the cuttle fish when it is relied on as a means of enabling the bird to sharpen its bill or beak.

I accomplish these objects by providing a perch so constructed that substantially the upper half is smooth in whole or in part, and substantially the lower half is rough or uneven in whole or in part. In this way, as hereinafter more fully explained, I provide an artificial means which approximates to some extent the natural conditions which render it impossible for birds at liberty to develop the defects which my invention is intended to cure.

Referring to the drawings, Figure 1 shows a perspective view of my improved perch made in imitation of the limb of a tree. Fig. 2 shows the perch as a hollow form adapted to be slipped over an ordinary wooden perch. Fig. 3 shows my improved device as having its smooth and coarse surfaces alternating on both top and bottom. Fig. 4 is a side view partly cut away and illustrates another form of my invention as hollow throughout substantially half its length with an opening at its lowest point, and Fig. 5 is a top view of a modification of the invention.

Similar numerals indicate corresponding parts in the drawings.

1 represents the smooth parts of the forms of perch shown, and 2 the roughened parts. 3 is a vertical slit or notch in the ends of the form shown in Fig. 1, to engage with a wire on either side of the cage, and illustrates a simple way of holding the perch in position. 4, 4 are circumferential grooves near the ends of the hollow perch, and show another simple way of fastening the device in position by pressing the wires aside sufficiently to insert the perch in place, the wires when released assuming their normal position and engaging with the said grooves. 5, 5 are small projections extending upward at a slight inclination, and are designed to afford comparatively prominent points for the bird to peck at or rub its bill against. These are not absolutely necessary, however, as the natural instinct of the bird will cause it to use the proper part of the perch for the same purpose.

In Figs. 3 and 4 side notches 6 illustrate another way of holding the perch in place by having the same contact with the wires. These side notches are preferable in the case of the hollow, or partly hollow perches, as they will absolutely prevent the perches from any side movement.

The form of my invention shown in Fig. 4 illustrates the perch as hollow for about half its length. The hollow section 13 extends upward in a rising curve from the middle of the perch to an opening 14 which projects outside of the wires of the cage, which contact with the notches 6 and hold the perch from sidewise movement. At the middle of the perch where the hollow channel ends there is an opening 15, the top of which opening is on a plane substantially parallel with the top of the opening 14. This perch is designed for the use of drinking water for the birds. A similar perch can be used to hold food or seed. A cover 16 of ordinary design is used to close the opening 14 to keep the contents of the perch free from dust and dirt. The channel or trough is preferably glazed to facilitate the movement of the food or water to the proper point, and prevent the water from soaking into the stone when stone is used.

In Fig. 5 I show a top view of my perch in rough elliptical form, narrowed at the ends and provided with the usual grooves to provide fastening means.

My invention can be constructed in different ways and of various shapes to suit requirements. Where the perch is to be used for birds I prefer that the upper part be made of a fine grade of stone, such, for instance, as is known as hone-stone, and the lower part of a coarser grade, the last mentioned grade, where its natural state does not meet requirements, being still further roughened or broken away in spots in any way.

Where the perch is made of two different grades of stone they can easily be cemented or fastened together in any one of numerous well known ways. Such perches can also be baked in any desired form or shape when made from artificial stone or clay.

I desire it to be understood, however, that my improved perch may also be made of the same grade of stone. The upper part can be shaped to the desired smoothness, and the lower part chiseled, or otherwise arranged, in such way as to give the irregularity or the unevenness or roughness required to wear away the growing claws of the bird by subjecting them to such use as birds at liberty encounter.

My improved device can also be built up from a rounded or other piece of wood or metal as a core, the upper surface of necessary material being cemented on, and smoothed, and the lower cemented on and roughened up or fashioned in the requisite way, as, for example, by the use of finely crushed stones, screened to suitable size, and cemented on as desired. Any natural or artificial stone can be used. Portland cement would make a good material and carborundum would also serve. Glass too, in the form of tubing or rods, could be roughened to the necessary degree on one side, or in sections, by diamond chips, emery or carborundum. A piece of metal would also suffice when properly prepared.

I do not limit myself to any particular material, nor to any method of arranging or fastening the materials together where more than one is used. Neither do I limit myself to any special means for fastening the device in place. In the drawings I show what I regard as the most simple ways of fastening the perch in place, but I do not restrict myself to these methods. Many forms of clamps common to the art could also be used as fastening means. The simplest way would be to make the perch slightly longer than the width of the cage in which it is to be used, and press the ends between the wires, the natural spring of the wires holding the perch in place.

I consider the fastening means of minor importance, however, as it is my idea to make the perch in standard sizes to be kept in stock ready for all ordinary demands, including the smaller sizes needed for swinging perches. It will, moreover, be easy to make a perch of any desired size to meet special conditions.

One of the advantages of my invention is that it is more sanitary than any perch heretofore known to the art, it will not afford any breeding places for vermin on account of the natural temperature of the stone, it can be easily taken out and cleaned or subjected to disinfection and, where the hollow style is used, another put in place.

Furthermore, when it becomes wet from water thrown off by the bird after or while taking a bath, it dries much quicker than a wooden perch, and is less likely to give the bird cold.

Another advantage of my improved perch is its economy as it will last indefinitely. Wooden perches after being cleaned and scraped a number of times, splinter and wear away and have to be replaced. My perch can be taken out and cleansed thoroughly as often as desired without being injured in any way.

While I have mainly described my invention as applicable to birds, it is self-evident that it can also be used for other animals in captivity, notably those of the cat tribe.

What I claim as new and desire to secure by Letters Patent, is:

1. A perch for the use of birds or other animals in captivity, consisting throughout substantially its entire length of a smooth hard upper surface, and a lower uneven rough surface, substantially as described.

2. A perch lower at the center than at the ends, the latter curving upward and outward, half of said perch being hollow, the hollow portion connecting with an opening through the upper surface at the lower middle part of the perch, the upper part of the perch being smooth and even, and the lower rough and course, and means for fastening the device in place, substantially as described.

3. A perch curving upward from the middle to either end, with a smooth upper surface and a rough lower surface, substantially half of said perch being hollow, the open outer end of the hollow portion adapted to be closed by a removable cap, an opening through the upper surface of the perch at its lowest point, the top of said opening being substantially on a plane with the top of the first named opening, said hollow portion being adapted to hold water or food for the bird or other animal, and fastening means at either end of said perch to prevent side movement, substantially as described.

4. A perch for the use of birds or other animals in captivity which is lower at the center than at the ends, substantially half of said perch being hollow, an opening at or near said lower point communicating with said hollow channel, and means for fastening same in place.

5. A perch for the use of birds or other animals in captivity which is lower at the center than at the ends, substantially half of said perch being hollow, an opening at or near said lower point communicating with said hollow channel, means for closing the outer end of said hollow channel, and means for fastening same in place, substantially as described.

6. A perch for the use of birds or other animals in captivity which is lower at the center than at the ends, substantially half of said perch being hollow, an opening at one end of the latter, said opening being in connection, through said hollow part, with another opening through the upper surface of the hollow part, and means for fastening the perch in place.

7. A perch curving upward from the middle whose surface is in part smooth or even and in part rough or uneven, a portion of said perch being hollow, the open outer end of the hollow portion adapted to be closed by removable means, another opening through the upper surface of the hollow portion of said perch at a point lower than the first-named opening, the tops of said openings being on substantially the same plane, and fastening means to prevent side movement, substantially as described.

8. A perch consisting of sections that are practically smooth or even and rough or uneven, said sections being situated one above the other throughout substantially the entire length of the perch.

9. A bird cage perch comprising an abradant bird support having a smooth portion directly under the feet of a bird standing on the perch, and an abradant surface in contact with the claws.

In testimony whereof, I have signed my name to this specification.

OSCAR FREY.

It is hereby certified that in Letters Patent No. 1,331,908, granted February 24, 1920, upon the application of Oscar Frey, of New York, N. Y., for an improvement in "Perches," an error appears in the printed specification requiring correction as follows: Page 1, line 68, and page 2, line 10, for the word "top" read *side;* and that the said Letters Patent should be read with this correction therein that the same may conform to the record of the case in the Patent Office.

Signed and sealed this 30th day of March, A. D., 1920.

[SEAL.]

M. H. COULSTON,
*Acting Commissioner of Patents.*

Cl. 119—26.